United States Patent Office
3,840,563
Patented Oct. 8, 1974

3,840,563
PRODUCTION OF PHTHALIC ANHYDRIDE
Otto Goehre, Wilhelmsfeld, and Wilhelm Friedrichsen, Ludwigshafen, Germany, assignors to Badische Anilin- & Soda-Fabrik Aktiengesellschaft, Ludwigshafen, (Rhine), Germany
No Drawing. Filed Feb. 4, 1972, Ser. No. 223,710
Claims priority, application Germany, Feb. 11, 1971, P 21 06 414.2
Int. Cl. C07c 63/02
U.S. Cl. 260—346.4     3 Claims

ABSTRACT OF THE DISCLOSURE

The production of carboxylic or dicarboxylic acids or anhydrides by oxidation of aromatic or unsaturated aliphatic hydrocarbons with oxygen or a gas containing oxygen in the presence of supported catalysts containing vanadium pentoxide in a tubular reactor whose tubes have roughened inner surfaces.

---

This invention relates to a process for the production of carboxylic acids, dicarboxylic acids or their anhydrides by catalytic oxidation of aromatic or unsaturated aliphatic hydrocarbons in tubular reactors having roughened tubes.

It is known that carboxylic acids, dicarboxylic acids or their anhydrides can be prepared by catalytic oxidation of aromatic hydrocarbons such as benzene, o-xylene or naphthalene, or of unsaturated aliphatic hydrocarbons such as butadiene, n-butene or mixtures containing butadiene and/or n-butene. In this method, which has achieved industrial importance particularly for the production of phthalic anhydride, the oxidation is advantageously carried out with air in the gas phase in contact with supported catalysts containing vanadium pentoxide at temperatures of from 300° to 500° C. in a tubular reactor consisting of a bundle of tubes surrounded by a heat exchange medium. In this continuous method a mixture of air and the hydrocarbon to be oxidized is passed through tubes filled with catalyst and the outer wall of the tubes is kept at the desired reaction temperature by means of the flowing heat exchange medium, for example a molten salt. The heat exchange medium may be passed countercurrent or cocurrent to the reaction mixture flowing through the tubes and thus removes from the reactor the excess heat generated in the exothermic reaction.

All tubular reactors in which the heat exchange medium is mainly unidirectional, i.e. does not flow turbulently, are suitable for carrying out this process. Reactors having annular channels along the circumference at the top and bottom through which the heat exchange medium is introduced or withdrawn centrally have proved to be particularly suitable. These reactors are described in French Pat. 1,577,926.

The temperatures in the interior of the tubes are from 20° to 150° C. higher than the bath temperature. An important parameter for the course of the reaction is the temperature maximum, known as the hot spot, which forms in the first third of the tubes reckoned from the point at which the gas enters. Beyond this the reaction of the remainder of the starting material and the degradation of the byproducts formed take place. The length of the tubes should therefore be chosen so that the starting material has been substantially reacted at the end of the catalyst bed. Generally a tube length of 3 meters is not enough and it has to be increased by 1 to 2 meters. It is also possible to use a second vessel in which the residual reaction takes place.

We have now found that in the production of carboxylic acids, dicarboxylic acids or their anhydrides by oxidation of aromatic or unsaturated aliphatic hydrocarbons with oxygen or gas containing oxygen in the presence of supported catalysts containing vanadium pentoxide the reaction can be carried out in a tubular reactor with shorter tubes or a smaller catalyst bed when all or part of the inner surface of the tubes has been roughened.

The advantage achieved by the new process is considerable because as compared with the conventional use of smooth tubes a saving of from about 30 to 100 cm. in tube length is possible. This advantage is due to the fact that a short distance beyond the hot spot the reaction mixture surprisingly has considerably less unchanged starting material than in the prior art methods.

The roughness (or unevenness) of the tubes is obtained for example by providing projections such as metal rings or spirals or by fusing metal powders onto the smooth internal surface of the tubes. It is advantageous however to provide depressions in the internal surface of the tubes, for example by chemical or mechanical means such as by milling or boring.

It is advantageous to use tubes whose internal surface is only partly roughened because it has been found that it is sufficient for example for only up to one third of the total length of the tubes to be provided with a roughened zone. The ratio of the roughened surface to smooth internal surface is preferably from 30 to 60%. According to a particularly advantageous embodiment of the invention only the portion of the tubes nearest to the gas inlet end is roughened, preferably for up to half of the total length of the tubes. It is sufficient if that portion of the tube is roughened which encloses the first 50 to 100 cm. of the catalyst bed while the inner face of the portion of the tube beyond that is smooth.

Tubes with an internal diameter of from 25 to 40 mm. in which the inner surface is provided with annular or spiral depressions having a width of 0.5 to 30 mm. and a depth of 0.2 to 1 mm. are particularly advantageous.

The new process is outstandingly suitable for the production of phthalic anhydride from o-xylene or naphthalene or a maleic anhydride from benzene or mixtures of butadiene and n-butene. For example a carrier provided with a melt of vanadium compounds and alkali pyrosulfate or a catalyst containing titanium dioxide and vanadium pentoxide may be used for the production of phthalic anhydride. A catalyst consisting of a nonporous carrier material and a catalyst mass consisting of from 2 to 40% by weight of vanadium pentoxide and from 60 to 98% by weight of anatase has proved to be particularly suitable. Such catalysts are described in French Pats. 1,480,078 and 1,592,666.

The catalyst is filled into tubes having a length of from 1.5 to 3 meters and an internal diameter of from 18 to 40 mm. Since spherical catalysts have proved most suitable, a tube diameter is chosen which is from three to six times the diameter of the spheres. Generally spheres are used having a diameter of from 7 to 10 mm., this advantageously not being more than one third of the tube diameter. 3500 to 10,000 liters of a mixture of air and hydrocarbon is passed per hour through each tube. The salt melt is kept at from 390° to 430° C. so that the hot spot in the catalyst chamber does not exceed 500° C. for a long time.

Catalysts which are described for example in German Pats. 1,115,241, 1,579,901 and 1,292,649 are used for the production of maleic anhydride.

The following example illustrates the invention.

EXAMPLE

Calcined magnesium silicate spheres having a diameter of 7.6 mm. are coated with 6% of active composition which consists of 6% of vanadium pentoxide, 0.4% of phosphorus pentoxide and 93.6% of anatase and introduced into a tube of 3 meters in length and an internal diameter of 25 mm. The tube is filled for a height of 2.50 meters. The upper portion of the vertical tube is roughened with a tap so that the depth of the groove is 0.7 mm. and the space between grooves is 1.8 mm.

The tube is placed in a salt bath consisting of a eutectic mixture of sodium nitrite and potassium nitrate and is kept at 380° C. 5100 liters of air with 204 g. of o-xylene is passed downwardly through the tube per hour. At a distance of 50 cm. from the point of entry (measured in the catalyst bed) the hot spot occurs. It adjusts to 475° C. At this point the reaction mixture contains 18% of unchanged starting material. The yield of phthalic anhydride (based on pure o-xylene) is 112% by weight at the end of the catalyst bed.

When the same reaction is carried out at the same temperature under otherwise identical conditions in a tube having a smooth inner surface, the hot spot similarly occurs at a distance of 50 cm. (measured in the catalyst bed) and has a temperature of 475° C. At this point the reaction mixture contains 50% of o-xylene. It is only at a distance of 125 cm., measured from the point of entry, that the reaction mixture contains 18% of o-xylene. To arrive at the same result, a catalyst bed is required in this case which is about 45 cm. longer.

We claim:

1. A process for the production of phthalic anhydride by oxidation of o-xylene or naphthalene with oxygen or a gas containing oxygen in the presence of a supported catalyst containing vanadium pentoxide in a reaction tube wherein the inner surface of said tube in which the oxidation is carried out has both smooth and roughened inner surface portions with 30 to 60% of said inner surface being roughened by annular or spiral depressions having a width of 0.5 to 30 mm. and a depth of 0.2 to 1 mm.

2. A process as claimed in claim 1 wherein said inner surface of said tube is roughened by said annular or spiral depressions for half the length of said tube measured from the point at which the gas enters said tube.

3. A process as claimed in claim 1 wherein said supported catalyst is in the form of a catalyst bed, and the portion of said tube which encloses the first 50 to 100 cm. of the catalyst bed, measured from the end nearest to the point at which the gas enters, is roughened by said annular or spiral depressions.

References Cited

UNITED STATES PATENTS 2,709,128   5/1955   Krause _____ 23—288

FOREIGN PATENTS 583,032   12/1946   Great Britain.

OTHER REFERENCES

Emmett: Catalysis, vol. 1, Fundamental Principles (part 1), Reinhold Publishers (1954), pp. 31–33.

Rideal: Concepts In Catalysis, Academic Press, New York (1968), p. 7.

HENRY R. JILES, Primary Examiner

B. DENTZ, Assistant Examiner

U.S. Cl. X.R.

23—288 M; 260—346.8, 523, 533